United States Patent [19]

De Mets

[11] 4,015,921

[45] Apr. 5, 1977

[54] CONTINUOUSLY OPERATING PRELIMINARY PRESS OR FINISHING PRESS FOR THE MANUFACTURE OF PARTICLE BOARDS, SUCH AS CHIP BOARDS, FIBER BOARDS AND THE LIKE

[75] Inventor: Albert De Mets, Roeselare, Belgium

[73] Assignee: Konstruktiewerkhuizen, DeMets N.V., Belgium

[22] Filed: Aug. 27, 1975

[21] Appl. No.: 608,343

[30] Foreign Application Priority Data

Aug. 27, 1974 Belgium .............................. 147937

[52] U.S. Cl. ................................ 425/371; 425/471; 100/151; 74/250 R; 305/58 R

[51] Int. Cl.$^2$ ........................................ B29C 15/00

[58] Field of Search .......... 425/223, 224, 371, 471; 305/30, 58; 198/189, 198, 199; 74/250 R, 250 C, 245 C, 245 LP; 100/151, 153

[56] References Cited

UNITED STATES PATENTS

| | | | |
|---|---|---|---|
| 2,727,794 | 12/1955 | Davidson et al. | 308/58 X |
| 3,883,284 | 5/1975 | De Mets | 425/371 |

*Primary Examiner*—Robert L. Spicer, Jr.
*Attorney, Agent, or Firm*—Craig & Antonelli

[57] ABSTRACT

Endless plate belts for use in a double belt press are formed from a plurality of articulated plates whose leading and trailing edges are provided with a series of projections and corresponding recesses. Each face of each plate at the leading and trailing belt plate edges defines a series of projections and recesses for meshing with the recesses and projections of adjacent plates. The projections and recesses on one face of a plate edge are arranged alternately with respect to the projections and recesses on the other face of the same plate edge.

20 Claims, 4 Drawing Figures

CONTINUOUSLY OPERATING PRELIMINARY PRESS OR FINISHING PRESS FOR THE MANUFACTURE OF PARTICLE BOARDS, SUCH AS CHIP BOARDS, FIBER BOARDS AND THE LIKE

BACKGROUND OF THE INVENTION

The present invention relates to a continuously operating preliminary or finishing press for the manufacture of particle boards such as chip or fiber boards or the like with two horizontal and parallel endless plate belts arranged one above the other and revolving around polygonal drums. Each endless belt consists of plates hinged to one another only in the area of the side surfaces thereof, i.e., only along their outer lateral edges. The edges of the plates extending transversely to the direction of movement of each endless plate belt are provided with essentially rectangular recesses and projections. See German Pat. No. 2,107,845.

The recesses and projections, provided at the individual plates of the endless plate belts exhibit, in the previously mentioned known presses, rectangular shapes, and adjacent plates are in this area pivotably connected one to the other through bolts, the lengths of which correspond to the plate widths. In order to keep the cross-sections of the bolts as small as possible, the number of recesses and projections is relatively high. The pressure forces generated therefore, are uniformly transmitted by each of the bolts. This solution is disadvantageous because the front edges of the projections of the plates in the area of impact spot may be deformed, this being due to the large number of recesses and projections and the necessary clearance of the bolts which increases with longer operating time. Even though danger of this deformation is not so great when the endless plate belts lie on pressure surfaces with relatively large lengths, this danger to deform the edges of the plates lying transversely to the direction of movement of the plate belts is particularly significant when the adjacent runs of the two endless plate belts, arranged one above the other, are acted on at least partly by driveable press-on drums or rollers.

In order to avoid this disadvantage, it was suggested in unpublished German unexamined published application No. 2,320,178 (U.S. Pat. No. 3,883,284) to shape the recesses and projections trapezoidally to triangularly, and to connect adjacent plates with each other by guide elements supported only in the zone of the lateral surfaces of the plates approximately the depth of the recesses of adjacent plates. In addition, each projection is equipped at its free end and each recess at its base with a rabbet and a flange. When viewed in the direction of the corresponding endless plate belts, each plate engages the subsequent plate in the entering area of the press in such a way that the flanges at the free end of the projections of each plate move into the open rabbets at the bases of the recesses of the preceeding plate. This solution has proven itself because the bending forces taken up by the projection of the plates are absorbed more easily and further because the press-on drums or rollers in the area of the impact points of adjacent plates are always in good contact. This solution is very suitable for the endless plate belts of finishing presses. This solution is not suitable for preliminary presses because the relatively long projections dig too deeply into the particle cake or fleece. If a particle cake is, however, already precompressed, only an additional compression must follow. In these situations, the relatively long projections do not have a disadvantageous effect, even though a certain pressure must be exerted on a precompressed particle cake to extend the time for hardening because the projections already lie in a plane.

SUMMARY OF THE INVENTION

Therefore, it is contemplated in accordance with the present invention to apply the pressure forces transmitted to the particle cake from the press-on drums or rollers onto the endless plate belts in the area of the connections of adjacent plates in such a way that in spite of the small thickness of the individual plates of the endless plate belts the pressures are transmitted to the next plate prior to the action of a press-on drum on this next plate.

For accomplishing this in accordance with the present invention, the endless plate belts are formed from a plurality of pivoted belt plates whose leading and trailing edges are provided with a series of projections and corresponding recesses, the outside edges of the projections being arranged in a direction transverse to the motion direction of the plates. Each face of each belt plate at the plate edges defines a series of projections and recesses for meshing with the recesses and projections of adjacent plates. Moreover, the projections and recesses on one face of a plate edge are arranged alternately with respect to the projections and recesses on the other face of the same plate edge. This solution which is also suitable for finishing presses is also especially suitable for preliminary presses because no large value is assigned to smallest possible tolerances in the thickness of the particle cake or fleece since only the cake or fleece is compressed. In contrast to the solution in which the projections and recesses are formed trapezoidally, the present invention brings the additional advantage of a less expensive production and a better distribution of the pressure forces experienced by the respective plates.

BRIEF DESCRIPTION OF THE DRAWINGS

The invention is schematically illustrated in the drawings, and the embodiment exemplified therein is explained below.

DETAILED DESCRIPTION

Figure 1:
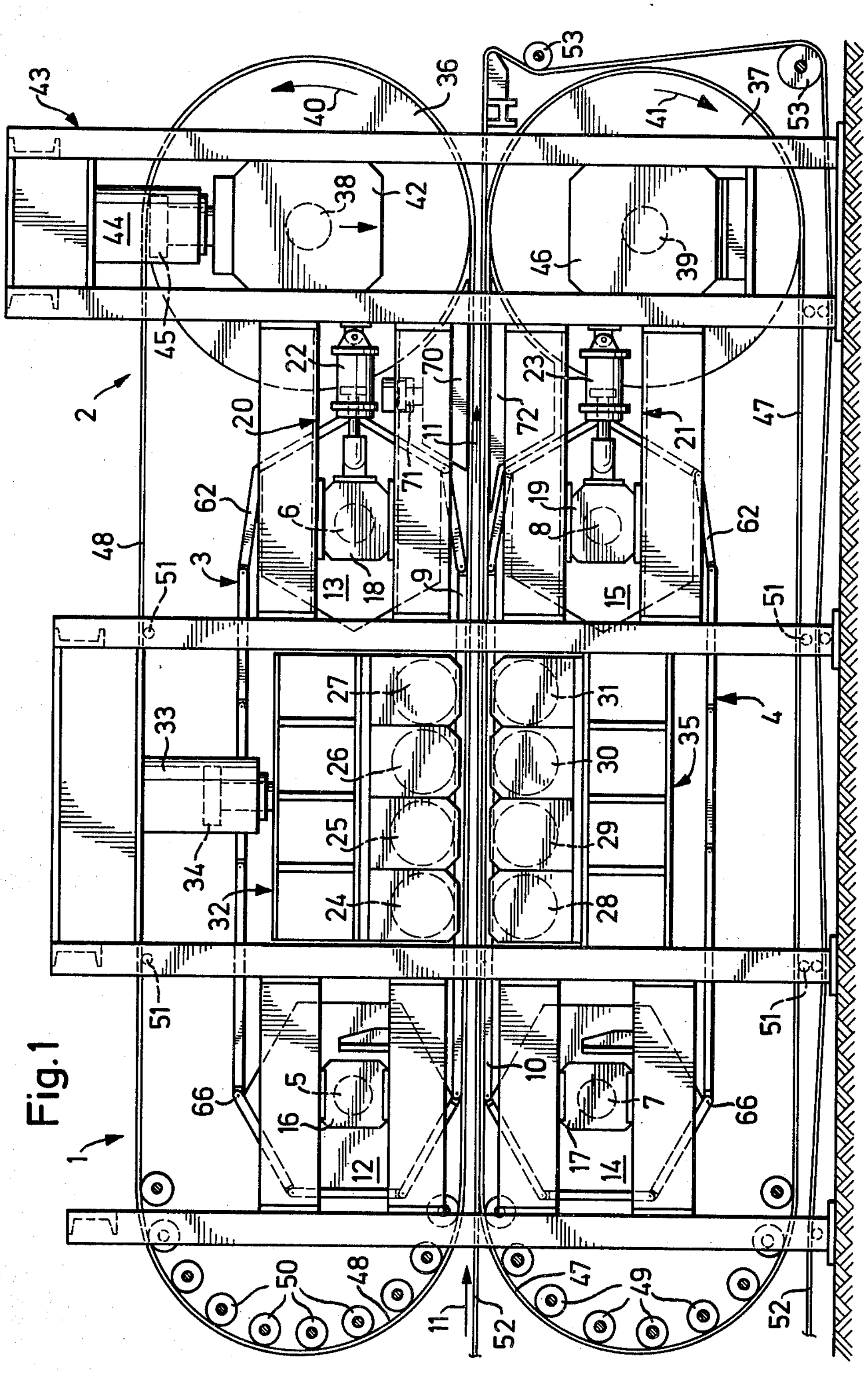
FIG. 1 shows a schematic side view of a press having endless plate belts arranged one above the other.

The exemplified embodiment of the press, shown in the drawing is provided with a low-pressure zone 1 in which the chips or other particles are first compressed with a pressure of about 10 kg/cm$^2$ and a high-pressure zone 2 in which, according to the board to be manufactured, a pressure of, for example, at least about 15 to 20 kg/cm$^2$ is exerted if the press is used as a continuously operating preliminary press.

The low-pressure zone is provided with two moveable endless plate belts 3 and 4 arranged one above the other which are each formed by flat, mutually pivoted (articulated) belt plates which are deflected about parallel, horizontal axes 5, 6, and 7, 8, respectively.

Facing runs 9 and 10 of the endless plate belts move in the direction of arrows 11. Endless plate belts 3 and 4 travel over polygonal reversing drums 12, 13 and 14, 15, respectively, which rotate about axes 5, 6, and 7, 8, respectively.

The shafts rotating about axes 5 and 7 are rotatable in machine-stationary bearings 16 and 17, whereas the shafts rotating about axes 6 and 8 are arranged in bearings 18 and 19 which are adjustably arranged on profiles 20 and 21. As illustrated in FIG. 1, profiles 20 and 21 operatively cooperate with repective cylinder-piston-mechanisms 22 and 23, which make it possible to tension endless plate belts 3 and 4. Furthermore, press-on drums or rollers 24 to 27 are provided to act on run 9 of upper endless plate belt 3, and press-on drums or rollers 28 to 31 are provided to act on run 10 of the lower endless plate belt. The axles of these press-on drums extend parallel to axles 5 to 8. At least some of these press-on drums are driven in a known manner.

Press-on drums 24 to 27 are arranged in a frame which is moveable in a vertical direction by a piston 34 sliding in a cylinder 33 in order to transmit the pressure onto the press-on drums 24 to 27 and hence onto run 9 of endless plate belt 3, this pressure being controllable.

In the same manner, the positioning of press-on drums 28 to 31 acting on run 10 can be controlled. In the case of the illustrated embodiment, these press-on drums are, however, provided in a machine-stationary frame.

High-pressure zone 2 of the press consists essentially of two drums 36 and 37 of a relatively large diameter which rotate about axes 38 and 39 in the directions of arrows 40 and 41, respectively. The shaft corresponding to axis 38 is supported in bearing blocks 42 which are moveable in a vertical direction in a frame 43 by means of a piston 45 sliding in a cylinder 44. By this means, the pressure of the drum 46 can be adjusted and regulated.

The shaft corresponding to the axis 39 is supported in machine-solid bearings 46 and also the frame 35 for the support of the press-on rollers 28 to 31 is arranged machine-solid.

Lower endless plate belt 4 and lower drum 37 are surrounded by a pliable endless steel band 47. In the same manner, upper endless plate belt 3 and upper drum 36 are surrounded by an analogous endless steel band 48. These endless steel bands 47 and 48 move together with the endless plate belts and drums which they surround, that is, at the same speed and the same direction.

Between endless plate belt 3 and drum 36, a sliding member 70 is provided which is moveable in a vertical direction by a cylinder-piston mechanism 71. Thus, sliding member 70 can be pressed onto the steel band 48 in order to keep this steel band in contact at the already compressed particle cake. In a similar manner, a similar sliding member 72 is provided between endless plate belt 4 and the drum 37. This sliding member is solidly connected at the frame of the press; also it does not have to be moved in a vertical direction.

Endless steel band 47 lies on run 10 of endless plate belt 4 and on sliding member 72. The endless steel band then travels over the circumference of the drum downwardly and is then fed over rollers 51 to supported reversing means which, in this case, consists of a number of rollers 49 until it lies again on run 10. The endless steel band 48 moves practically in the same manner over run 9 of endless plate belt 3, sliding member 70, and upper drum 36. Endless steel band 48 is then supported over rollers 51 and fed to a reversing means consisting of rollers 50.

The particle cake to be compressed is moved in this press by an endless transport band 52, the length of which is considerably larger than the length of endless steel bands 47 and 48. Endless transport band 52 is moved by a control device which deposits the small particles (i.e., chips, fibers, etc.) to be used in the formation of the particle cake onto the transport band. Transport band 52 is guided at the outside of the press by means of reversing rollers or the like 53.

At least some of the press-on drums or rollers, for example, press-on drums 25 and 29, are driven by a motor, not shown, through gears, Cardan shafts or the like. Also, drums 36 and 37 around which the endless steel bands 47 and 48 are guided may be driven by these motors.

Endless plate belts 3 and 4 consist of a number of essentially rectangular belt plates of equal size, the long (i.e., transverse edges of which are connected with each other by simple hinges 66. See FIG. 2. At the plate transverse edges relatively wide projections 63 and 64 are provided which are constructed such that the projections, when the plates of the plate belts are extended (as when in the area of runs 9 and 10) lie in corresponding recesses of the transverse edges of adjacent plates so that the forces absorbed by one plate are transferred immediately and uniformly to the two adjacent plates. The plates which follow each other in these areas, therefore, form a flat upper and a flat lower surface.

Figure 2:
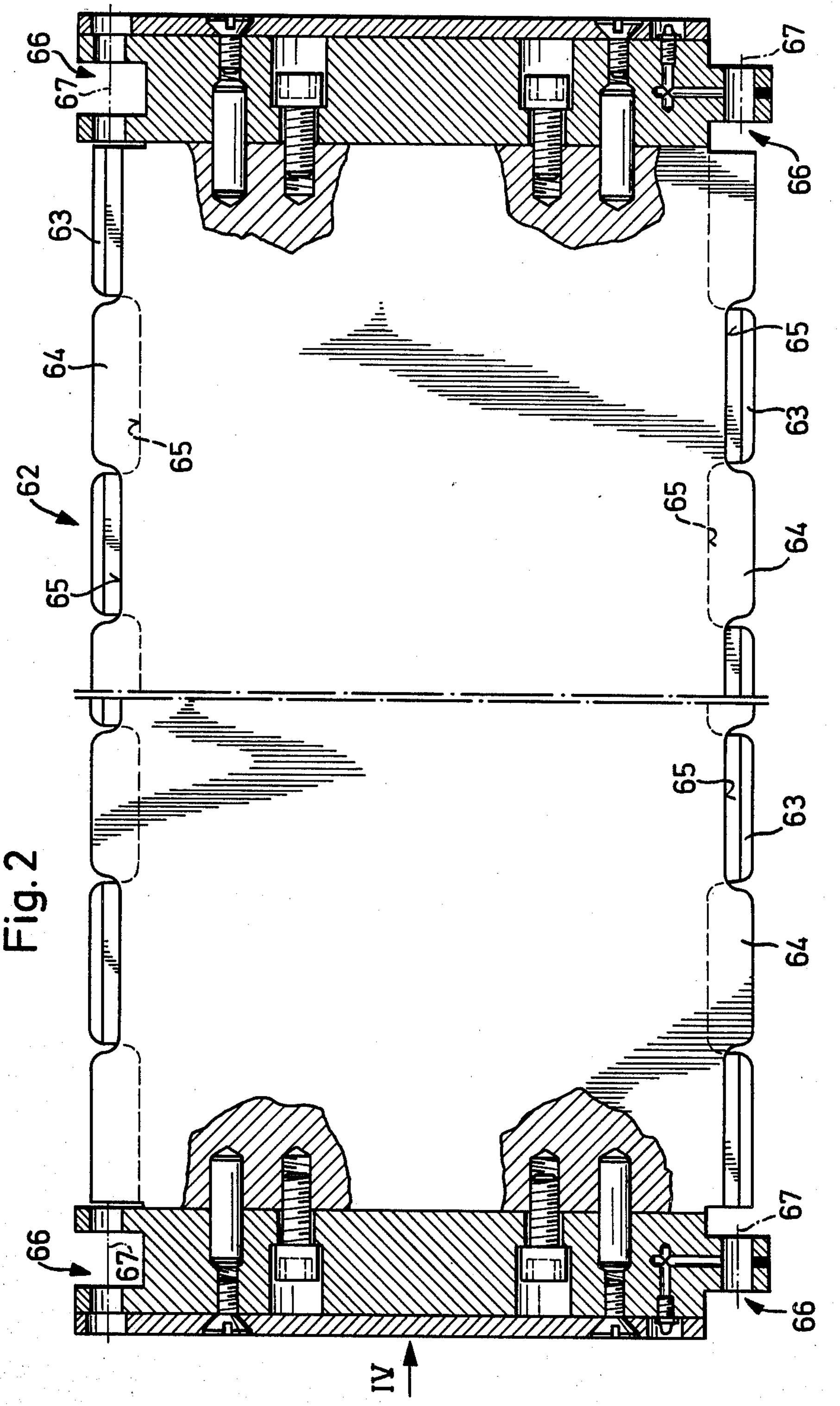
FIG. 2 shows a view of one of the plates of the endless plate belts, the side areas of the plate being shown in partial cross-section.
Figure 3:
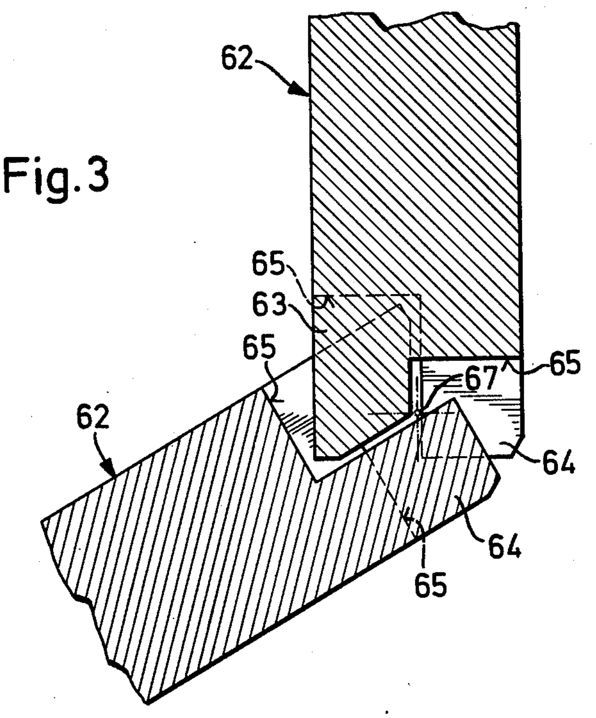
FIG. 3 shows a partial cross-section through two plates pivotably attached to one another.
Figure 4:
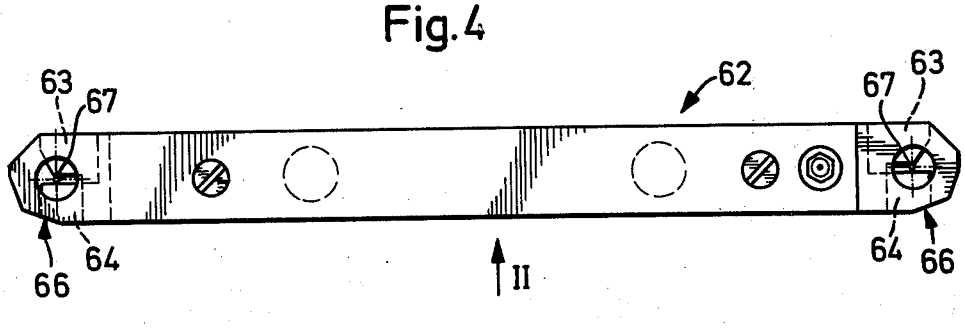
FIG. 4 shows a side view, the plate in FIG. 2 taken along line IV—IV of FIG. 2, FIG. 4 being illustrated in enlarged scale.

In FIG. 2 and FIG. 3, the projections which lie in the upper surface or face of each plate are designated as 63 and those in the lower surface or face as 64. The recesses receiving these projections are designated 65. As will be noted from the figure, each projection in the upper surface or face of the plate is open towards the lower surface or face of that plate. In other words, each projection in the upper face of a plate at an edge thereof faces a recess in the lower face of the plate at that edge. Similarly, each projection in the lower surface or face is open to the upper surface of the plate. Each recess 65 is determined by two consecutive projections provided on the same surface or face of the plate, and the projection which extends between these two projections on the other surface or face of the plate. Therefore, each plate with its projections, engages into recesses of the other plate. The swinging axis 67, FIG. 2, is also designated in FIGS. 3 and 4. It should also be observed that the recesses and the projections on the surface of the plates facing the press-on drums or rollers are deeper and longer respectively than the recesses and projections of the opposite surface of the plates which is clearly shown in FIG. 3.

The foregoing description has been presented for illustrative purposes only and is not intended to limit the invention in any way. All reasonable modifications not specifically disclosed are intended to be included within the scope of the present invention which is to be limited only by the following claims.

What is claimed is:

1. In a press for the manufacture of particle boards comprising two endless plate belts arranged one above the other to define a material-treatment path therebetween, said endless plate belts being mounted for revolution around polygonal drums, the improvement wherein at least one of said plate belts includes a plurality of essentially rectangular belt plates, directly and pivotally mounted to one another, so that adjacent belt plates pivotally move with respect to one another around only a single mutual pivotal axis, said belt plates being mounted to one another only along the lateral edges of said belt plates, each face of each of said belt plates defining at the leading and trailing edges of each belt plate a series of projections and recesses for meshing with the recesses and projections of adjacent belt plates, the projections and recesses on one face of each belt plate edge being arranged alternatively with respect to the projections and recesses on the other face of the same belt plate edge.

2. The press of claim 1, wherein the leading and trailing edges of said projections and said recesses extend transversely to the motion direction of the endless plate belts.

3. The press of claim 2, wherein at least one recess of at least one belt plate is determined by two consecutive projections provided on the same belt plate face as said at least one recess and a third projection extending between these two projections on the other face of said at least one belt plate.

4. The press of claim 3, further comprising press-on rollers engaging the portions of said endless plate belts defining said material-treatment path for compressing the material passing through said material-treatment path.

5. The press of claim 4, wherein the projections and recesses on the faces of said belt plates facing said material-treatment path are longer in the travel direction of said endless plate belts than the projections and recesses on the opposite surfaces of said plates.

6. The press of claim 3, wherein the projections and recesses on the faces of said plates facing said material-treatment path are longer in the travel direction of said endless plate belts than the projections and recesses on the opposite faces of said plates.

7. The press of claim 1, wherein each of said endless plate belts is completely formed by said articulated belt plates.

8. The press of claim 1 wherein the outer edges of the projections on both faces of each belt plate edge lie in a common plane.

9. The press of claim 8 wherein said projections and recesses are essentially rectangular.

10. The press of claim 3 wherein the outer edges of the projections on both faces of each belt plate edge lie in a common plane.

11. In a continuously operating press for the manufacture of particle boards such as chip boards, fiber boards and the like in which two endless plate belts are arranged one above the other and are mounted for revolution around polygonal drums, the endless plate belts being composed of a plurality of belt plates pivoted to one another at the lateral edges thereof only, the transverse edges of the belt plates being provided with projections and recesses for meshing with corresponding recesses and projections of adjacent belt plates, each endless plate belt being surrounded by an endless steel band, the improvement wherein each of said plate belts is essentially rectangular, the outer surfaces of the projections of each belt plate being transverse to the motion direction of the endless plate belts, each surface of each belt plate at the leading and trailing edges thereof defining projections and grooves, the projections and grooves on each face of each belt plate at the edge portions thereof being arranged alternately with respect to the projections and recesses on the other face of the same belt plate edge said plate belts being directedly and pivotally connected to one another so that adjacent belt plates pivotally move with respect to one another around only a single mutual pivotal axis.

12. The press of claim 11 wherein the outer edges of the projections on both faces of each belt plate edge lie in a common plane.

13. The press of claim 12 wherein said projections and recesses are essentially rectangular.

14. An endless plate belt for use in a double belt press comprising a plurality of flat articulated essentially rectangular belt plates arranged together in the form of an endless belt, each belt plate defining a leading edge and a trailing edge transverse to the motion direction of the endless plate belt when in motion and two lateral edges between said leading and trailing edges, adjacent plates being directly pivotably secured to one another at the respective leading and trailing edges thereof by hinge means connected to said plates at the lateral edges thereof only such that adjacent plate belts pivotally move with respect to one another around only a single mutual pivotal axis, each belt plate defining an inside face facing the inside of said endless plate belt and an outside face opposite said inside face, the inside face of each belt plate at the leading edge thereof defining a first system of projections and grooves for meshing with a corresponding system of projections and grooves on the outside face of the trailing edge of the adjacent leading plate, the projections on the inside face of said plate at said leading edge being arranged alternately with respect to the projections and on the outside face of said plate at said leading edge.

15. The endless plate belt of claim 14, wherein at least one recess of at least one belt plate is determined by two consecutive projections provided on the same belt plate face as said at least one recess and a third projection extending between these two projections on the other face of said at least one belt plate.

16. The press of claim 11, wherein at least one recess of at least one belt plate is determined by two consecutive projections provided on the same belt plate face as said at least one recess and a third projection extending between these two projections on the other face of said at least one belt plate.

17. The press of claim 14 wherein the outer edges of the projections on both faces of each belt plate edge lie in a common plane.

18. In a press for the manufacture of particle boards comprising two endless plate belts arranged one above the other to define a material-treatment path therebetween, at least one plate belt formed from a plurality of articulated belt plates including at least one pair of adjacent belt plates composed of a first belt plate and a second belt plate following said first said belt plate, the trailing edge of said first belt plate defining a system of projections and recesses, the leading edge of said second belt plate defining a corresponding system of recesses and projections for meshing with the projections and recesses on the trailing edge of said first belt plate, said endless plate belts being mounted for revolution around polygonal drums, the improvements wherein each face of said first belt plate at the trailing edge thereof defines a series of alternating projections and recesses, the projections defined by one face of said belt plates facing the recesses defined by the opposite face of said belt plate at said trailing edge, said belt plates being directly and pivotally connected to one another such that adjacent belt plates pivotaly move with respect to one another around only a single mutual pivotal axis, said belt plates being mounted to one another along the lateral edges thereof only, said belt plates being substantially rectangular.

19. The press of claim 18 wherein the outer edges of the projections on both faces of each belt plate edge lie in a common plane.

20. An endless plate belt for use on a continuously operating double belt press comprising a plurality of plates hingedly joined together only at the lateral edges thereof, said plates being provided along the edges thereof extending at right angles to the direction of movement of each endless plate belt with substantially rectangular recesses, said recesses consisting of grooved sections arranged on the topside and the underside of each plate in mutually alternating relationship so that the upwardly open grooved sections (63) on the trailing edge of one plate engage the downwardly open grooved sections (64) of the leading edge of the next following plate and further so that the grooved areas (63, 64) located in the pressing zone in the horizontal plane are in mutual contact.

* * * * *